United States Patent
Gale et al.

(10) Patent No.: US 8,793,042 B2
(45) Date of Patent: Jul. 29, 2014

(54) METHOD AND SYSTEM FOR CHARGING A VEHICLE BATTERY

(75) Inventors: Allan Roy Gale, Livonia, MI (US); Bruce Carvell Blakemore, Plymouth, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 13/192,507

(22) Filed: Jul. 28, 2011

(65) Prior Publication Data

US 2013/0026970 A1    Jan. 31, 2013

(51) Int. Cl.
B60L 9/00 (2006.01)
B60W 10/00 (2006.01)

(52) U.S. Cl.
CPC ........................... *B60W 10/00* (2013.01)
USPC .......................................................... 701/22

(58) Field of Classification Search
CPC ........................... Y02T 10/7077; B60W 10/00
USPC ...................................................... 701/1, 22
See application file for complete search history.

(56) References Cited

U.S. PATENT DOCUMENTS

| | | | |
|---|---|---|---|
| 4,079,303 A * | 3/1978 | Cox | 320/119 |
| 5,659,237 A | 8/1997 | Divan et al. | |
| 5,782,880 A | 7/1998 | Lahtinen et al. | |
| 5,869,951 A | 2/1999 | Takahashi | |
| 6,451,463 B1 | 9/2002 | Tsai et al. | |
| 6,646,419 B1 | 11/2003 | Ying | |
| 7,091,700 B2 | 8/2006 | Kadouchi et al. | |
| 7,245,108 B2 | 7/2007 | Chertok et al. | |
| 7,274,170 B2 | 9/2007 | Benckenstein, Jr. et al. | |
| 7,489,106 B1 | 2/2009 | Tikhonov | |
| 8,207,740 B2 | 6/2012 | Lin et al. | |
| 2003/0152830 A1 | 8/2003 | Eaves | |
| 2006/0119319 A1 | 6/2006 | Sakurai et al. | |
| 2006/0246329 A1 * | 11/2006 | Gopal et al. | 429/18 |
| 2007/0257641 A1 | 11/2007 | Sada et al. | |
| 2008/0197707 A1 | 8/2008 | Chi Yang | |
| 2010/0261048 A1 | 10/2010 | Kim et al. | |
| 2011/0025258 A1 * | 2/2011 | Kim et al. | 320/106 |
| 2011/0078092 A1 | 3/2011 | Kim et al. | |
| 2011/0093223 A1 | 4/2011 | Quet | |

* cited by examiner

*Primary Examiner* — Behrang Badii
*Assistant Examiner* — Daniel L Greene
(74) *Attorney, Agent, or Firm* — David B. Kelley; Brooks Kushman P.C.

(57) ABSTRACT

A vehicle power system includes a battery having a plurality of cells and at least one controller. The at least one controller causes the cells to acquire charge for a period of time such that at the expiration of the period of time, voltages of some of the cells are approximately equal to a specified voltage, amp·hours stored by other of the cells are approximately equal, and an amount of energy stored by the battery is at least equal to a predetermined target energy amount.

17 Claims, 2 Drawing Sheets

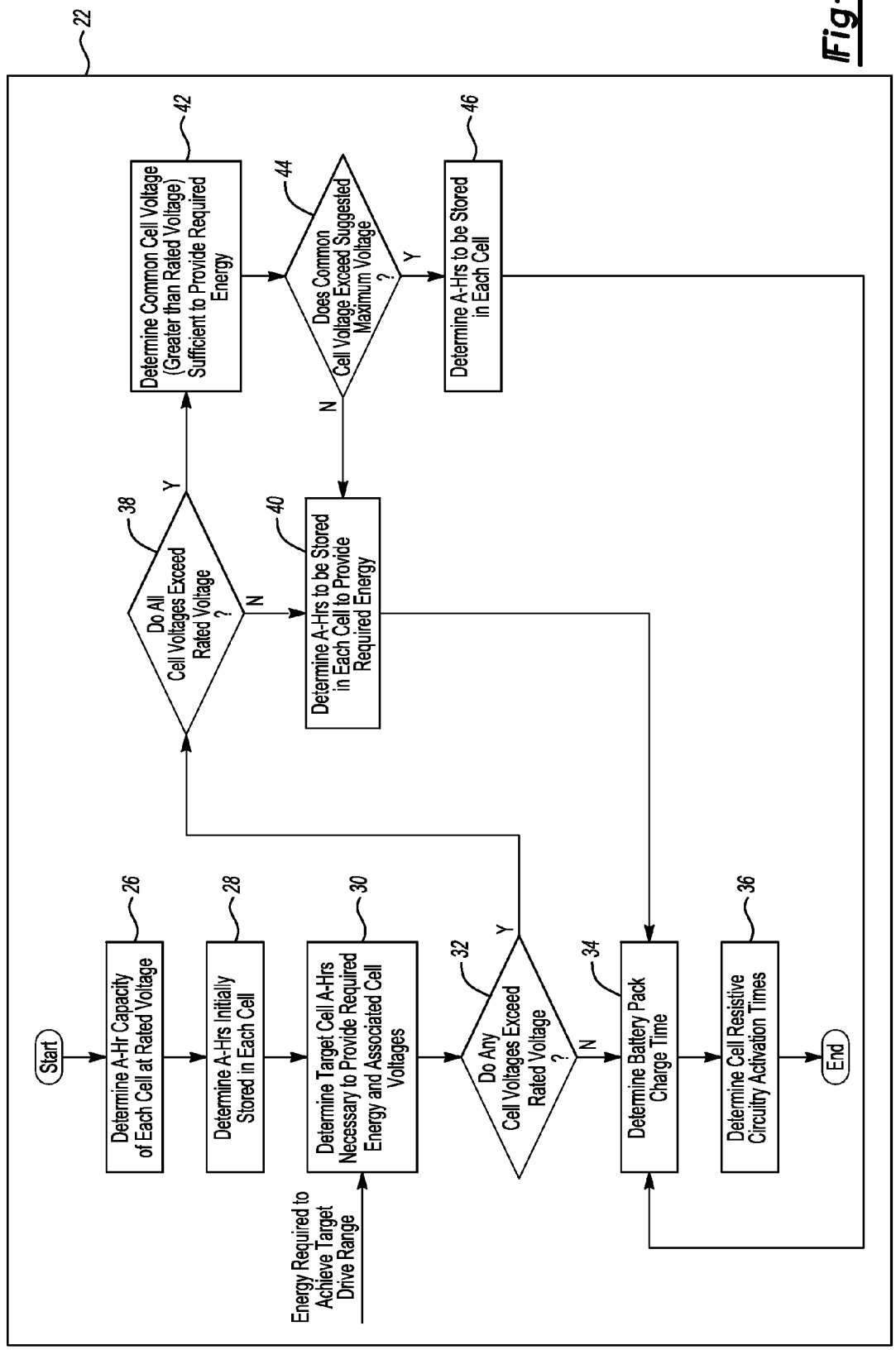

METHOD AND SYSTEM FOR CHARGING A VEHICLE BATTERY

TECHNICAL FIELD

This disclosure relates to charging a vehicle's battery such that it may store sufficient energy to drive the vehicle a specified distance.

BACKGROUND

A driver of an alternatively powered vehicle, such as plug-in hybrid electric vehicle, a battery electric vehicle, etc., may desire that their vehicle be able to travel a certain number of miles between battery charges.

SUMMARY

Some cells of a traction battery may be charged to a specified common target voltage, and other cells of the traction battery may be charged to a predetermined common target capacity such that an amount of energy stored by the traction battery is at least equal to a predetermined target energy amount.

BRIEF DESCRIPTION OF THE DRAWINGS

FIG. 2 is a flow chart illustrating an algorithm for charging a vehicle battery.

DETAILED DESCRIPTION

Figure 1:
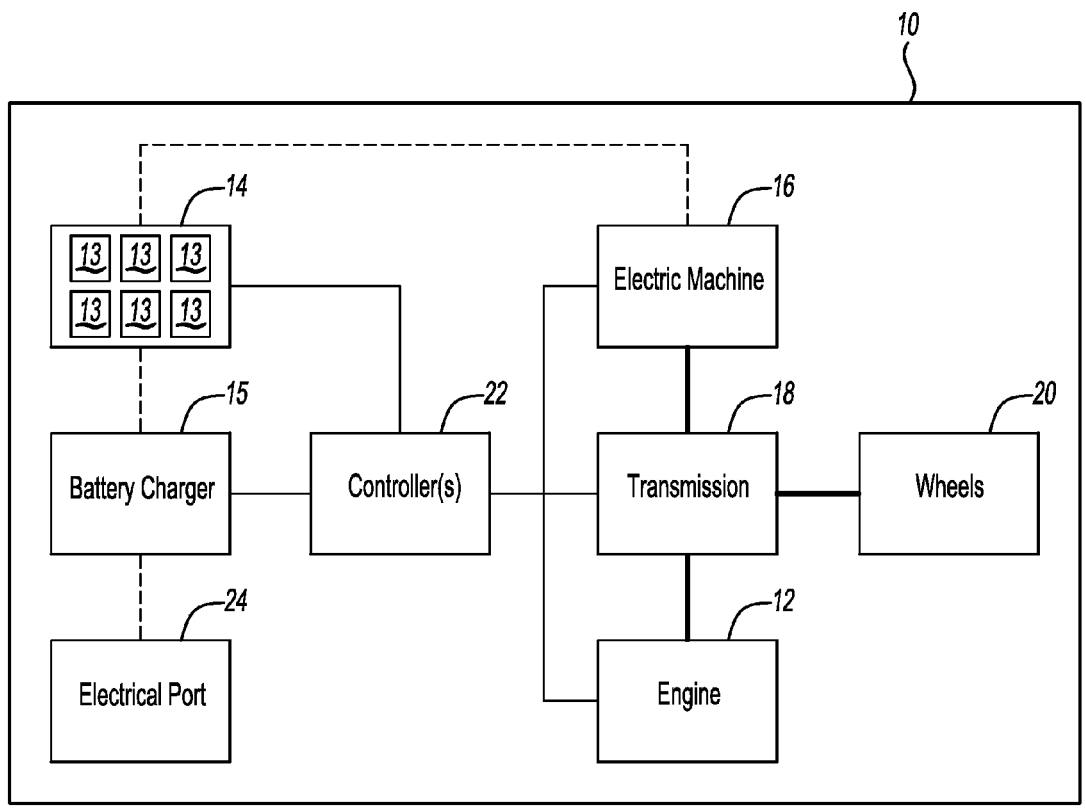
FIG. 1 is a block diagram of a plug-in hybrid electric vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Introduction

Cells of a battery pack may be charged so as to store energy sufficient to support a target drive range. Each of the cells, for example, may be charged to a common target capacity (target A·hrs) such that they collectively store the required energy. Certain cells, however, may become capacity limited as they age: greater cell voltages may be needed in order to achieve the common target capacity; a voltage limit (e.g., the full rated cell voltage) may eventually preclude the target A·hrs from being stored by one or more of the cells. Algorithms and systems implementing the same contemplated herein may address this and other issues concerning charging a battery pack so as to store energy sufficient to support a target drive range.

Cell Capacity

A battery cell's maximum capacity, $Ihr_{max}$, may be approximated from the following set of equations:

$$Ihr_{max} = \frac{\Delta Ihr}{\Delta SOC} \quad (1)$$

and $$SOC = \left(\frac{v_{cell} - V_{min}}{V_{max} - V_{min}}\right) \quad (2)$$

where $\Delta Ihr$ is the change in capacity in the cell, $\Delta SOC$ is the change in state of charge of the cell, $V_{max}$ is the rated voltage of the cell at full charge (100% SOC), $V_{min}$ is the rated voltage of the cell at zero charge (0% SOC), and $v_{cell}$ is the measured cell voltage. As an example, the SOC of a given cell may be determined before and after 1 A·hr of capacity is provided to it. Assuming a $\Delta SOC$ of 10% for this example, the cell's maximum capacity, $Ihr_{max}$, would be 10 A·hrs.

Cell Energy Content

A battery cell's energy content, $\epsilon$, may be approximated from the following set of equations:

$$\epsilon = \int \rho \cdot dt \quad (3)$$

where $\rho$ is the power applied to the cell over time. $\rho$ may be written as $$\rho = v_m i \quad (4)$$

where $v_m$ is the (measured) voltage associated with the power stored and $i$ is the current associated with the power stored. Substituting (4) into (3) yields $$\epsilon = \int v_m \cdot i \cdot dt \quad (5)$$

$v_m$ may be written as $$v_m = \Delta v + V_{min} \quad (6)$$

where $V_{min}$ is the voltage of the cell at 0% state of charge (e.g., 3.1 V) and $\Delta v$ is the difference between the voltage associated with the power stored and the voltage of the cell at 0% state of charge. Substituting (6) into (5) yields $$\epsilon = \int (\Delta v + V_{min}) i \, dt \quad (7)$$

$\Delta v$ may be written as $$\Delta v = i \cdot \frac{V_{max} - V_{min}}{Ihr_{max}} \cdot t \quad (8)$$

where $V_{max}$ is the voltage of the cell at full state of charge, $Ihr_{max}$ is the cell's maximum capacity, and $t$ is the time over which the change in voltage occurs. Substituting (8) into (7) yields $$\epsilon = \int \left( \left( i \cdot \frac{V_{max} - V_{min}}{Ihr_{max}} \cdot t \right) + V_{min} \right) i \, dt \quad (9)$$

Integrating (9) yields $$\epsilon = i^2 \cdot \frac{V_{max} - V_{min}}{Ihr_{max}} \cdot \frac{t^2}{2} + V_{min} \cdot i \cdot t \quad (10)$$

$i \cdot t$ may be written as $$i \cdot t = Ihr \quad (11)$$

which is the capacity in the cell. Substituting (11) into (10) yields $$\epsilon = \frac{V_{max} - V_{min}}{Ihr_{max}} \cdot \frac{Ihr^2}{2} + V_{min} \cdot Ihr \quad (12)$$

Cell Capacity to Provide Specified Energy Content: No Cells A·Hr Capacity Limited (Phase 1)

Assume, for example, that a given battery pack having 20 cells in series needs to store at least 30 kW·hrs of energy to support a drive range of 100 miles. (Testing, simulation, etc. may determine, for a given vehicle, the energy required to support a specified drive range.) That is, the sum of energies stored by the cells of the battery pack should be at least equal to 30 kW·hrs when all cells are charged to the same A·hrs. (12) may be evaluated for each of the cells and summed to determine if that sum is at least equal to 30 kW·hrs. An initial value (e.g., 1 A·hr) for Ihr may be assumed, $V_{max}$ and $V_{min}$ are known by design, and $Ihr_{max}$ can be determined from (1). If the sum of the cell energies is less than, in this example, 30 kW·hrs, the value for Ihr may be incremented by 1 A·hr and (12) evaluated again for each of the cells iteratively (assuming none of the cells have a limit as to the amount of A·hrs they are capable of storing) until the sum of the cell energies is at least equal to 30 kW·hrs. The capacity value resulting in the sum of the cell energies being at least equal to 30 kW·hrs is the target cell capacity value (the target Ihr value).

Cell Capacity to Provide Specified Energy Content: Some Cells A·Hr Capacity Limited (Phase 2)

Due to cell maximum capacity differences caused by manufacturing, age, usage, etc., a selected drive range may require a target Ihr value that exceeds a particular cell's (or cells') $Ihr_{max}$. The battery pack may be considered A·hr limited in this case. That is, there may be circumstances in which the capacity of a particular cell (or cells) to store energy should not exceed a threshold. A voltage limit (e.g., the full rated voltage) of a cell, for example, may preclude additional A·hrs from being stored by that cell, etc. The limited cell (or cells), in this case, may be charged to their respective $Ihr_{max}$ while the remaining energy required to meet the specified drive range may be stored among the non-limited cells.

Assume again that a given battery pack having 20 cells needs to have available 30 kW·hrs of energy to support a drive range of 100 miles; and, assume that a subset, n, of the 20 cells are A·hr limited because, for example, each of the cells of the subset would reach its full rated cell voltage before storing their otherwise equal portion of the required energy to support the 100 mile drive range. If the cells are connected in series, they will discharge at the same A·hr rate. This common discharge rate will limit all the cells from fully discharging (whether A·hr limited or not) except for the cell having the minimum maximum capacity, $Ihr_{max\_min}$. All other cells will retain some A·hr capacity after discharge of the cell string. Hence, the energy provided by each of the other cells (i.e., those cells that do not have the minimum maximum capacity) may be calculated based on the discharge of $Ihr_{max\_min}$.

Expanding (12) yields the available energy for each cell, $\epsilon_{avlb}$, $$\epsilon_{avlb} = \left( \frac{V_{max} - V_{min}}{Ihr_{max}} \cdot \frac{Ihr^2}{2} + V_{min} \cdot Ihr \right) - \left( \frac{V_{max} - V_{min}}{Ihr_{max}} \cdot \frac{(Ihr - Ihr_{max\_min})^2}{2} + V_{min} \cdot (Ihr - Ihr_{max\_min}) \right) \quad (13)$$

(13) may be solved for each of the A·hr limited cells by setting Ihr equal to the cell's $Ihr_{max}$ found from (1) ($V_{max}$ and $V_{min}$ are known by design and $Ihr_{max\_min}$ is the minimum of the $Ihr_{max}$ values). A difference between the sum of the energies of the A·hr limited cells and the required available energy may then be taken. Continuing with the example above, if 30 kW·hrs of energy needs to be available to support the 100 mile drive range and the sum of the energies of the A·hr limited cells is 12 kW·hrs, then the resulting difference is 18 kW·hrs. The non-limited cells need to have 18 kW·hrs of energy available, in this example, to support the 100 mile drive range. To determine the target Ihr value of the non-limited cells needed to provide 18 kW·hrs of energy, the techniques described in the section titled "Cell Capacity to Provide Specified Energy Content: No Cells A·hr Capacity Limited" may be used (using (13) instead of (12)). If any of the cells initially classified as non-limited are found to subsequently be capacity limited at the increased target Ihr value, the algorithm described with respect to (13) may simply be iteratively repeated.

Cell Capacity to Provide Specified Energy Content: All Cells A·hr Capacity Limited (Phase 3)

If all cells of a battery pack are A·hr capacity limited, they will achieve their full rated voltage before storing energy sufficient to meet the specified vehicle drive range. The maximum voltage each cell is allowed to achieve during charge may need to be increased beyond the full rated voltage limit to permit the cells to store the required energy. The rated voltage may initially be selected to balance battery pack performance and life, and is assumed to be set equal to or less than the cell manufacturer's suggested maximum voltage. Hence, the maximum voltage limit may be increased to achieve the specified drive range. The target voltage necessary to achieve the specified drive range may be found by iteratively increasing V. (i.e. $V_{max} = V_{max} + \Delta V_{max}$), recalculating each cell's $Ihr_{max}$ from (1), and determining the target cell capacity value (the target Ihr value) according to the algorithms discussed in the above sections (depending on whether any of the cells remain A·hr capacity limited) until sufficient energy to meet the target drive range is achieved.

Cell Capacity Insufficient to Provide Specified Energy Content (Phase 4)

Eventually the determined $V_{max}$ necessary to permit energy storage sufficient to meet the target drive range will exceed the manufacturer's suggested maximum voltage. In this case, the cells are charged to the manufacturer's suggested maximum voltage.

This transition from Phase 3 to Phase 4 may provide an indication of remaining battery pack life considering that when all cells are charged to the manufacturer's suggested maximum voltage, there is insufficient energy to meet the target drive range. (The other transitions described above, e.g., the transition from Phase 1 to Phase 2, etc., may also provide an indication of remaining battery life.) A warning or other alert may thus be generated to inform the driver that the battery can no longer provide the required drive range or to suggest that the battery be replaced.

Total Battery Pack Charge Time

Ihr from (12) may be written as $$Ihr = \Delta Ihr + Ihr_{initial} \quad (14)$$

where $Ihr_{initial}$ is the initial amount of A·hrs stored in the cell (before cell balancing/charging) and $\Delta Ihr$ is the difference in the amount of A·hrs stored in the cell before cell charging and after cell charging (to the target Ihr value). $Ihr_{initial}$ is a function of the measured voltage of the cell. Hence, a look-up table mapping values of cell voltage to Ihr may be used to determine $Ihr_{initial}$ based on the initial measured cell voltage. (8) may also be used to find the initial capacity by solving for i·t (cell capacity) and setting Δv equal to the measured voltage of a particular cell ΔIhr for each cell may thus be found from (14).

The total charge time, $t_c$, (or time during which the cells are to receive current) for a battery pack may be found according to $$t_c = \frac{\Delta Ihr_{maxcell}}{i_{chg}} \qquad (15)$$

where $\Delta Ihr_{maxcell}$ is the maximum of the ΔIhr values determined from (14) and $i_{chg}$ is the charge current of the pack.

Cell Resistive Circuitry Activation Times

Cell balancing may be accomplished by first determining the amount of Ihrs correction a cell needs, $Ihr_{bleed}$, according to $$Ihr_{bleed} = \Delta Ihr_{maxcell} - \Delta Ihr \qquad (16)$$

where $\Delta Ihr_{maxcell}$ is the maximum of the ΔIhr values determined from (14) and ΔIhr is the difference in the amount of A·hrs stored in the cell before cell charging and after cell charging.

Cell balancing requires some form of energy transfer to or from an individual cell. The most common method is to place a resistance across the individual cell for a period of time, $t_R$, to remove energy. This balancing may be completed during the cell charge time, $t_c$, assuming $t_c$ is greater than $t_R$. Hence, a cell whose resistive circuitry is activated will acquire charge at a rate different than a cell whose resistive circuitry is not activated.

The duration of time during which a cell's resistive circuitry may be activated to cause the cell to supply a cell load current while the cell is receiving current may be found from the equation $$Ihr_{bleed} = \int \frac{v_{cell}}{R} dt \qquad (17)$$

where $v_{cell}$ is the measured voltage of the cell and R is the resistance of the bleed resistor associated with the cell. (17) may be rewritten as $$Ihr_{bleed} \cong \frac{V_{cell}}{R} \cdot t_R \qquad (18)$$

where $V_{cell}$ is preferably the known average value of the cell voltage during balancing discharge. Solving for $t_R$ yields the cell's resistive circuitry activation time. If any $t_R$ is greater than $t_c$, the battery pack may simply be balanced/charged using traditional techniques.

Battery Pack Balancing/Charging

Referring to FIG. 1, an embodiment of a plug-in hybrid electric vehicle (PHEV) 10 may include an engine 12, a plurality of cells 13 forming a traction battery 14, a battery charger 15 and an electric machine 16. The PHEV 10 may also include a transmission 18, wheels 20, controllers 22 and an electrical port 24.

The engine 12, electric machine 16 and wheels 20 are mechanically connected with the transmission 18 (as indicated by thick lines) in any suitable/known fashion such that the engine 12 and/or electric machine 16 may drive the wheels 20, the engine 12 and/or wheels 20 may drive the electric machine 16, and the electric machine 16 may drive the engine 12. Other configurations, such as a battery electric vehicle (BEV) configuration, etc., are also contemplated. The battery 14 may provide energy to or receive energy from the electric machine 16 (as indicated by dashed line). The battery 14 may also receive energy from a utility grid or other electrical source (not shown) via the electrical port 24 and battery charger 15 (as indicated by dashed line). The controllers 22 are in communication with and/or control the engine 12, battery 14, battery charger 15, electric machine 16 and transmission 18 (as indicated by thin lines).

Referring to FIG. 2, the A·hr capacity of each of the cells at the rated voltage is determined at operation 26. The controllers 22, for example, may execute the algorithms discussed in the section titled "Cell Capacity." At operation 28, the A·hrs initially stored in each of the cells may be determined. For example, the controllers 22 may reference a look-up table mapping measured voltage with A·hrs as discussed in the section titled "Total Battery Pack Charge Time." At operation 30, the target A·hrs necessary to provide the required energy and associated cell voltages may be determined. The controllers 22 may, for example, execute the algorithms discussed in the section titled "Cell Capacity to Provide Specified Energy Content: No Cells A·hr Capacity Limited" to determine the target A·hrs and employ equations (6), (8) and (11) to determine the cell voltages corresponding with the target A·hrs. At operation 32, it is determined whether any of the cell voltages exceed the rated voltage. If no, the battery pack charge time is determined at operation 34. For example, the controllers 22 may execute the algorithms discussed in the section titled "Total Battery Pack Charge Time." At operation 36, the cell resistive circuitry activation times may be determined. The controllers 22, for example, may execute the algorithms discussed in the section titled "Cell Resistive Circuitry Activation Times."

Returning to operation 32, if yes, it is determined whether all of the cell voltages exceed the rated voltage at operation 38. If no, the target A·hrs to be stored in each cell to provide the required energy may be determined at operation 40. For example, the controllers 22 may execute the algorithms discussed in the section titled "Cell Capacity to Provide Specified Energy Content: Some Cells A·hr Capacity Limited." The algorithm then proceeds to operation 34.

Returning to operation 38, if yes, the common cell voltage greater than the rated voltage sufficient to provide the required energy is determined at operation 42. The controllers 22, for example, may execute the algorithms discussed in the section titled "Cell Capacity to Provide Specified Energy Content: All Cells A·hr Capacity Limited." At operation 44, it is determined whether the common cell voltage exceeds the manufacturer's suggested maximum voltage. If no, the algorithm proceeds to operation 40. If yes, the A·hrs to be stored in each of the cells is determined at operation 46. For example, the controllers 22 may determine the $Ihr_{max}$ of each cell by executing the algorithms discussed in the section titled "Cell Capacity" where $V_{max}$ is set equal to the manufacturer's suggested maximum voltage. The cells, in this instance, will be charged to their $Ihr_{max}$. The algorithm then proceeds to operation 34.

Once the battery pack charge time and the individual cell resistive circuitry activation times have been determined, cells 13 of the battery pack 14 may be supplied current for the period defined by the battery pack charge time as determined at operation 34. The resistive circuitry associated with each of the cells may concurrently be activated for their respective activation times as determined at operation 36. This may effectively balance and charge the battery pack 14 (assuming the battery pack charge time is greater than each of the resistive circuitry activation times).

As apparent from the discussion above, all the cells 13 will have approximately the same A·hrs stored at the expiration of the battery pack charge time if Phase 1 applies. Some of the cells 13 (the limited-cells) will have approximately the same voltage (full rated voltage) while other of the cells 13 (the non-limited cells) will have approximately the same A·hrs stored at the expiration of the battery pack charge time if Phase 2 applies. Either all the cells 13 will have approximately the same A·hrs stored at the expiration of the battery pack charge time or some of the cells 13 will have approximately the same voltage while other of the cells 13 will have approximately the same A·hrs stored at the expiration of the battery pack charge time if Phase 3 applies. All of the cells 13 will have approximately the same voltage at the expiration of the battery pack charge time if Phase 4 applies.

The algorithms disclosed herein may be deliverable to/implemented by a processing device such as the battery charger 15 or controllers 22. Such devices may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms of the invention. For example, a linear relationship of battery voltage, SOC and A·hrs has been described; for those familiar in the art, however, non-linearities of the battery characteristics may be accommodated via look-up tables and functions characterizing the battery to be used.

The words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a battery including a plurality of cells; and,
at least one controller configured to cause the cells to receive current for a period of time and, during the period of time, to cause one or more of the cells to supply cell load current such that at the expiration of the period of time, voltages of some of the cells are approximately equal to a specified voltage and amp·hours stored by other of the cells are approximately equal to a specified amp·hours, wherein voltages of at least some of the other of the cells are not approximately equal and wherein an amount of energy stored by the battery is at least equal to a predetermined target energy amount.

2. The vehicle of claim 1 further comprising an electric machine configured to transform electrical energy from the battery to mechanical energy to move the vehicle.

3. The vehicle of claim 1 wherein the specified voltage is a full rated cell voltage.

4. The vehicle of claim 1 wherein the at least one controller is further configured to determine, for each of the one or more of the cells, a duration of time to cause the cell to supply cell load current.

5. The vehicle of claim 4 wherein the steps of causing the cells to receive current for a period of time and, during the period of time, causing one or more of the cells to supply cell load current are performed if each of the durations of time is less than the period of time.

6. The vehicle of claim 4 wherein each of the durations of time to cause the cells to supply cell load current is based on an initial capacity of the corresponding cell.

7. A method for charging cells of a traction battery comprising:
charging some of the cells to a specified common target voltage; and
charging other of the cells to a predetermined common target capacity such that voltages of at least some of the other of the cells are not approximately equal and an amount of energy stored by the cells is at least equal to a predetermined target energy amount.

8. The method of claim 7 wherein the steps of charging some of the cells to a specified common target voltage and charging other of the cells to a predetermined common target capacity are performed concurrently.

9. The method of claim 7, wherein the steps of charging some of the cells to a specified common target voltage and charging other of the cells to a predetermined common target capacity are performed during a first period of time, further comprising charging the cells to a predetermined common target capacity prior to the first period of time.

10. The method of claim 7, wherein the steps of charging some of the cells to a specified common target voltage and charging other of the cells to a predetermined common target capacity are performed during a first period of time, further comprising charging the cells to a common voltage after the first period of time.

11. The method of claim 10 wherein the common voltage is approximately equal to a manufacturer's suggested maximum cell voltage.

12. The method of claim 7 wherein the steps of charging some of the cells to a specified common target voltage and charging other of the cells to a predetermined common target capacity include causing each of one or more of the cells to supply cell load current for a different duration of time.

13. The method of claim 12 wherein the steps of charging some of the cells to a specified common target voltage and charging other of the cells to a predetermined common target capacity are performed if each of the durations of time is less than a battery total charge time.

14. A vehicle power system comprising:
a battery including a plurality of cells; and
at least one controller configured to cause the cells to acquire charge for a period of time such that at the expiration of the period of time, voltages of some of the cells are approximately equal to a specified voltage and amp·hours stored by other of the cells are approximately equal to a specified amp·hours, wherein voltages of at least some of the other of the cells are not approximately equal and wherein an amount of energy stored by the battery is at least equal to a predetermined target energy amount.

15. The system of claim 14 wherein the rates at which charge is acquired by the cells are different among at least some of the cells for at least a portion of the period of time.

16. The system of claim 15 wherein the at least one controller is further configured to cause the at least some of the cells to supply cell load current for the at least a portion of the period of time.

17. The system of claim 16 wherein the at least some of the cells supply cell load current for different durations of time.

* * * * *